United States Patent
Kubota et al.

(10) Patent No.: US 8,715,428 B2
(45) Date of Patent: May 6, 2014

(54) HOT-FORGING MICRO-ALLOYED STEEL AND HOT-ROLLED STEEL EXCELLENT IN FRACTURE-SPLITABILITY AND MACHINABILITY, AND COMPONENT MADE OF HOT-FORGED MICROALLOYED STEEL

(75) Inventors: Manabu Kubota, Tokyo (JP); Shinya Teramoto, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 12/450,567

(22) PCT Filed: Nov. 5, 2008

(86) PCT No.: PCT/JP2008/070537
§ 371 (c)(1),
(2), (4) Date: Sep. 29, 2009

(87) PCT Pub. No.: WO2009/107282
PCT Pub. Date: Sep. 3, 2009

(65) Prior Publication Data
US 2010/0143180 A1 Jun. 10, 2010

(30) Foreign Application Priority Data
Feb. 26, 2008 (JP) .................. 2008-045140

(51) Int. Cl.
C22C 38/00 (2006.01)
C22C 38/02 (2006.01)
(52) U.S. Cl.
USPC ........................................ 148/320; 420/84

(58) Field of Classification Search
USPC ........................................ 148/320; 420/84
See application file for complete search history.

(56) References Cited

U.S. PATENT DOCUMENTS

| 6,475,305 | B1 | 11/2002 | Watari et al. |
| 6,632,296 | B2 * | 10/2003 | Yoshinaga et al. ............ 148/320 |
| 6,858,101 | B1 * | 2/2005 | Hashimura et al. ........... 148/320 |

FOREIGN PATENT DOCUMENTS

| EP | 1264909 | 12/2002 |
| JP | 62-196359 | 8/1987 |
| JP | 9-176785 | 7/1997 |
| JP | 11-286746 | 10/1999 |
| JP | 2000-073141 | * 3/2000 |
| JP | 2001-262267 | 9/2001 |

(Continued)

OTHER PUBLICATIONS

International Search Report dated Feb. 24, 2009 issued in corresponding PCT Application No. PCT/JP2008/070537.

*Primary Examiner* — Sikyin Ip
(74) *Attorney, Agent, or Firm* — Kenyon & Kenyon LLP

(57) ABSTRACT

The invention provides a hot-forging micro-alloyed steel and a hot-rolled steel which achieve excellent fracture-splitability and machinability, without impairing productivity or mechanical properties and without addition of Pb or the like. It also provides a component made of hot-forged micro-alloyed steel. The hot-forging micro-alloyed steel contains, in mass %, C: greater than 0.35 to 0.60%, Si: 0.50 to 2.50%, Mn: 0.20 to 2.00%, P: 0.010 to 0.150%, S: 0.040 to 0.150%, V: 0.10 to 0.50%, Zr: 0.0005 to 0.0050%, Ca: 0.0005 to 0.0050% and N: 0.0069 to 0.0200%, Al being limited to less than 0.010%, and a balance of Fe and unavoidable impurities.

7 Claims, 1 Drawing Sheet

(a)

(b)

50 μm

(56) References Cited

FOREIGN PATENT DOCUMENTS

| JP | 2002-256394 | 9/2002 |
| JP | 2003-193184 | 7/2003 |
| JP | 2003-301238 | 10/2003 |
| JP | 2003-342671 | 12/2003 |
| JP | 2004-277840 | 10/2004 |
| JP | 2005-54228 | 3/2005 |
| JP | 2006-206934 | 8/2006 |
| JP | 2007-277705 | 10/2007 |
| JP | 2007277705 | * 10/2007 |

* cited by examiner

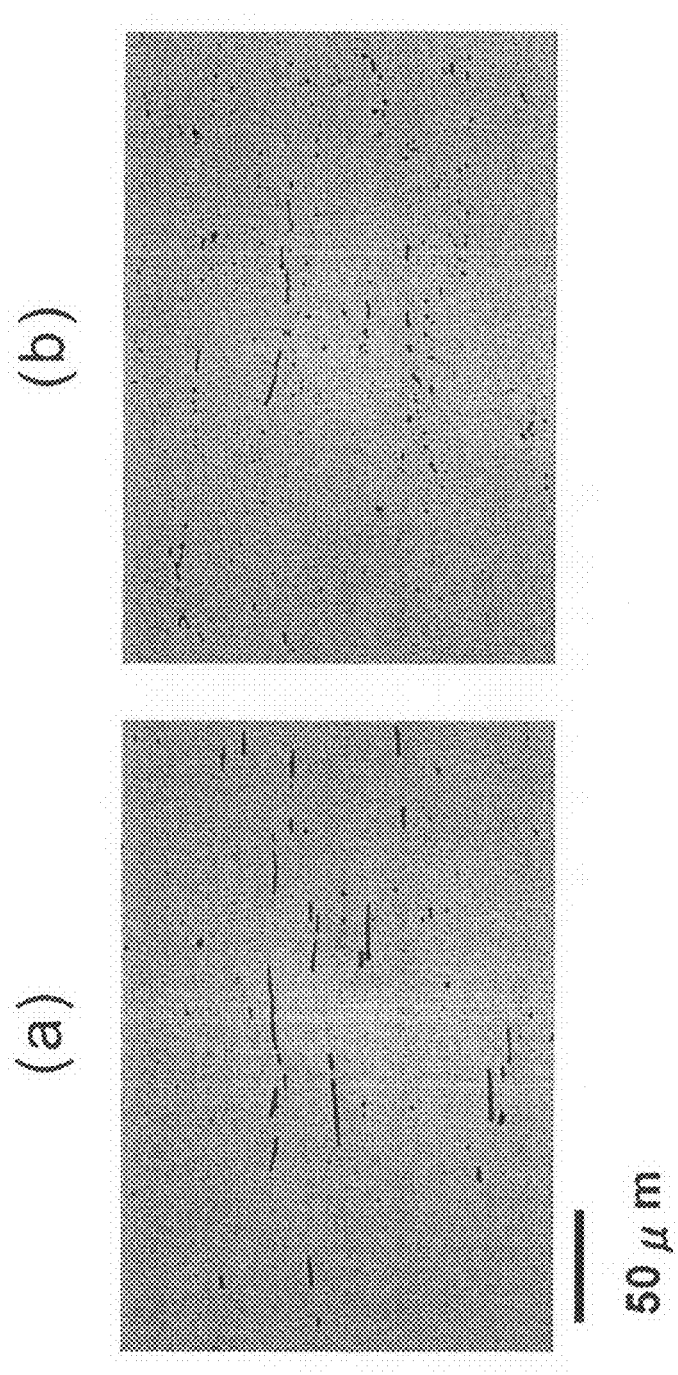

HOT-FORGING MICRO-ALLOYED STEEL AND HOT-ROLLED STEEL EXCELLENT IN FRACTURE-SPLITABILITY AND MACHINABILITY, AND COMPONENT MADE OF HOT-FORGED MICROALLOYED STEEL

This application is a national stage application of International Application No. PCT/JP2008/070537, filed Nov. 05, 2008, which claims priority to Japanese Application No. 2008-045140, filed Feb. 26, 2008, which is incorporated by reference in its entirety.

FIELD OF THE INVENTION

This invention relates to a hot-forging micro-alloyed steel and hot-rolled steel which are excellent in fracture-splitability and machinability and usable for steel components separated for use by fracture-splitting, and to a component made of hot-forged micro-alloyed steel.

DESCRIPTION OF THE RELATED ART

The recent practice in forged automobile engine and suspension components is to utilize hot-forging micro-alloyed steels that eliminate the need for quench-temper treatment. A micro-alloyed steel is designed to have a chemical composition that enables the steel to achieve excellent mechanical properties in its air-cooled or forced-air-cooled state.

One component that micro-alloyed steel has been extensively applied to is the engine connecting rod (or "conrod"), which is the engine component that transmits piston motion to the crankshaft. It comprises two parts, namely, a cap and a rod. The conrod is attached to the crankshaft at its "big end" by bolting the cap and rod together with the crankshaft clamped in between. The long-established method of fabricating a conrod was first to forge a cap and rod separately or in a unitary shape that was later cut mechanically and then to subject the mating faces of the cap and rod to high-precision machining. In addition, pin processing for preventing misalignment of the mating faces was usually performed. This further complicated the processing steps and increased production costs.

In light of these drawbacks, a new method of dealing with conrod fabrication and installation emerged relatively recently. Specifically, the cap and rod are forged in a unitary shape, notches are formed on the inside of the big end, and the cap and rod are fracture-split by applying impact tensile stress in the cold state. The conrod is attached to the crankshaft using the fracture-split faces as the mating faces in their "as split" condition without machining. This method makes it possible to eliminate the mating face machining process. It also makes pin processing unnecessary because misalignment can be prevented by taking advantage of fracture-split face roughness. Component processing cost decreases accordingly. Another merit is that the conrod can be reduced in size and weight because the elimination of the pins decreases the mating face area.

In Europe and the United States, where the fracture-split conrod is widely adopted, the steel most commonly used for conrod production is C70S6 under the DIN standard. This is a high-carbon micro-alloyed steel containing 0.7% C. It is given a structure consisting almost entirely of low ductility/toughness pearlite in order to minimize dimensional change during fracture-splitting. Although C70S6 is excellent in fracture-splitability thanks to its small deformation during splitting, it has a coarser structure than the ferrite/pearlite structure of the medium-carbon micro-alloyed steels currently used as conrod steels. It is therefore low in yield ratio (yield strength/tensile strength) and cannot be applied to high-strength conrods requiring high yield strength. Moreover, the inferior machinability of C70S6 owing to its pearlite structure has kept the steel from finding extensive utilization.

In order to elevate yield ratio, it is necessary to keep carbon content low and increase the ferrite fraction. However, increasing ferrite fraction increases ductility/toughness. Since heavy plastic deformation therefore occurs near the split faces during fracture-splitting, fracture-splitability is degraded by increased deformation of the inside diameter of the big end of the conrod. On the other hand, Pb has frequently been added to steels for high-strength, micro-alloyed steel conrods for the purpose of enhancing machinability. But a steel added with Pb is no longer practical because Pb use needs to be restricted nowadays owing to the load it places on the natural environment. Thus, the unresolved issue regarding steels for fracture-split conrods is to develop a technology capable of concomitantly achieving low carbon content (high yield strength) and good fracture-splitability and of achieving satisfactory machinability without addition of Pb or other substances that increase environmental load.

Steels for fracture-split components have been developed in response to the foregoing needs. For example, Japanese Patent Publication (A) No. 2002-256394 teaches structure refinement by regulating the balance between O and Al and between O and N. However, it has the drawback of using Pb or the like as the means for ensuring machinability. Japanese Patent Publication (A) No. 2003-193184 teaches fracture-splitability and machinability improvement by defining C and V content and ferrite area fraction. However, owing to the low ferrite area fraction of 20% or less, yield ratio is so low as to make application to a high-strength conrod impractical. Another problem is that improvement of machinability is inadequate because the pearlite structure fraction is large, so that Pb or the like is used as means for ensuring machinability. Japanese Patent Publication (A) No. 2003-301238 teaches that by prescribing the number of MnS particles so as to enhance structure refinement, it is possible to increase yield strength and simultaneously improve fracture-splitability. This technology calls for dispersion of much MnS of an equivalent circular diameter of around 1 μm. But addition of the large amount of S for this purpose inevitably leads to occurrence of elongated MnS having a coarse aspect ratio owing to extension in the rolling or forging direction. When such elongated coarse MnS is present, cracks occur in the manner of peeling parallel to the direction of MnS elongation, in what is called "separation." As a result, fracture-splitability becomes worse, not better, owing to increased deformation during fracture-splitting. Another disadvantage of this prior art is that it uses Pb or the like as means for ensuring machinability. Japanese Patent Publication (A) No. 2000-73141 teaches that fracture-splitability is improved by prescribing the number of sulfide inclusions of not less than 1 μm width and further defining their aspect ratio, thereby lowering ductility/toughness. However, the presence of a large amount of dispersed coarse MnS of not less than 1 μm width increases the rate of crack occurrence during hot-forging and degrades the fatigue properties. Japanese Patent Publication (A) No. 2005-54228 teaches improvement of steel fracture-splitability by heating the steel to an ultra-high temperature near the solidus-liquidus so as to coarsen the structure markedly. But this technique poses major practicability issues because forging at an ultra-high temperature not only requires an investment in new equipment for heating but also lowers yield and increases decarburization and scale.

SUMMARY OF THE INVENTION

The object of the present invention is to deal with the foregoing circumstances by providing a hot-forging micro-alloyed steel and hot-rolled steel which are excellent in fracture-splitability and machinability, without impairing productivity or mechanical properties and without addition of Pb or the like, and to a component made of hot-forged micro-alloyed steel.

The present invention was achieved based on the finding that by optimizing C and V content to enhance fracture-splitability, and further and simultaneously controlling the added amounts of the three components Zr, Ca and Al, thereby finely dispersing a large amount of MnS inclusions, it is possible to enhance fracture-splitability to above the prior art level without degrading mechanical properties and productivity and simultaneously to improve machinability without adding Pb or the like. The gist of the invention is as set out below. As termed with regard to the present invention, "MnS inclusions" is defined to include not only MnS but also other inclusions comprised primarily of MnS but containing sulfide-forming elements such as Ca and Mg or carbosulfide-forming elements such as C, Ti, and Zr.

(1) A hot-forging micro-alloyed steel excellent in fracture-splitability and machinability comprising, in mass %, C: greater than 0.35 to 0.60%, Si: 0.50 to 2.50%, Mn: 0.20 to 2.00%, P: 0.010 to 0.150%, S: 0.040 to 0.150%, V: 0.10 to 0.50%, Zr: 0.0005 to 0.0050%, Ca: 0.0005 to 0.0050% and N: 0.0020 to 0.0200%, Al being limited to less than 0.010%, and a balance substantially of Fe and unavoidable impurities.

(2) A hot-forging micro-alloyed steel excellent in fracture-splitability and machinability according to (1), further comprising, in mass %, one or more of Cr: 0.05 to 0.25%, Nb: 0.005 to 0.050% and Ti: 0.005 to 0.050%.

(3) A hot-forging micro-alloyed steel excellent in fracture-splitability and machinability according to (1) or (2), further comprising, in mass %, Mg: 0.0005 to 0.0050%.

(4) A hot-rolled, hot-forging micro-alloyed steel excellent in fracture-splitability and machinability having a steel composition set out in any of (1) to (3), wherein the number of MnS inclusions of 1 μm or greater width present at ¼ diameter of the hot-rolled steel is 10% or less (including 0%) of the total number of MnS inclusions thereat and the average aspect ratio of the MnS inclusions is 10 or less.

(5) A hot-forged micro-alloyed steel component excellent in fracture-splitability and machinability having a steel composition set out in any of (1) to (3), wherein the steel structure comprises a bainite fraction of 3% or less (including 0%) and a balance of ferrite/pearlite.

BRIEF DESCRIPTION OF THE DRAWINGS

FIG. 1 is a pair of images showing the state of MnS inclusions in steels, wherein (a) and (b) show the states of MnS inclusions in a comparative example and an invention example, respectively.

DETAILED DESCRIPTION OF THE INVENTION

The inventors carried out an in-depth study regarding the factors that affect the fracture-splitability and machinability of a micro-alloyed steel for fracture-split components. Their findings were as follows:

(a) Fracture-splitability markedly declines when bainite forms, making it necessary to prevent bainite formation and establish a structure composed almost entirely of ferrite/pearlite.

(b) Both fracture-splitability and yield ratio can be improved by optimizing C content. Specifically, excessive C content lowers yield ratio by increasing coarse pearlite fraction, while deficient C content lowers fracture-splitability by increasing high ductility/toughness and causing excessive structure refinement.

(c) Both fracture-splitability and yield ratio can be improved by adding a relatively large amount of V. Specifically, ferrite is strengthened by precipitation hardening caused by precipitation of V carbides and carbonitrides during cooling following hot-forging. Since the ferrite strengthening reduces ductility/toughness, good fracture-splitability can be achieved and yield ratio is also increased.

(d) When small-aspect-ratio MnS inclusions are abundantly and finely dispersed in the steel, the MnS inclusions act as crack propagation paths during fracture-splitting, thereby improving fracture-splitability. The cracks that propagate via the abundantly and finely dispersed MnS inclusions of less than 1 μm width have a beneficial effect on fracture-splitability because they grow linearly with little branching or bending, thereby minimizing deformation during fracture-splitting. On the other hand, when the amount of coarse MnS inclusions of 1 μm or greater width is great, separation occurs and cracks form parallel to the direction of MnS inclusion elongation. Fracture-splitability therefore declines owing to increased deformation during fracture-splitting.

(e) Abundant, fine dispersion of small-aspect-ratio MnS inclusions in the steel enables improvement of machinability without impairing mechanical properties such as fatigue properties even when S content is increased.

(f) In order to achieve optimum improvement of fracture-splitability and machinability by abundant, fine dispersion of small-aspect-ratio MnS inclusions in the steel, it is necessary simultaneously to control the added amounts of the three components Zr, Ca and Al. Namely, it is very effective to increase S content while adding small amounts of Zr and Ca, while at the same time limiting Al content. Specifically, slight addition of Zr causes formation in the steel of $ZrO_2$ and Zr-containing oxides (hereinafter sometimes called "Zr oxides") that act as crystallization and precipitation nuclei of MnS inclusions. The effect of the Zr oxides as precipitation nuclei is maximized by incorporating Ca oxides into the Zr oxides. Since simultaneous slight addition of Zr and Ca therefore increases the number of effective crystallization and precipitation sites for MnS inclusions, it enables uniform, fine dispersion of the MnS inclusions. Further, Zr and Ca dissolve into the MnS inclusions to form complex sulfides and lower the deformability thereof, thereby inhibiting drawing of the MnS inclusions during rolling and hot-forging. But when Al is added, preferential formation of $Al_2O_3$ in the steel lowers the steel O content. As a result, formation of Zr oxides that produce an effect of uniformly and finely dispersing MnS inclusions is inhibited. Al content must therefore be limited to the utmost possible.

Excessive Zr and Ca addition causes formation of large amounts of hard ZrN, ZrS, CaO and other hard inclusions and clusters thereof. As this has the contrary effect of degrading machinability, fatigue properties and other mechanical properties, the amounts of Zr and Ca addition must be controlled to within a low range. Thus, simultaneous control of Zr, Ca and Al addition is highly effective for achieving abundant, fine dispersion of MnS inclusions and, by this, enables simultaneous improvement of fracture-splitability and machinability.

The present invention is explained in detail below. The reasons for defining the chemical composition of the steel will be explained first. Unless otherwise indicated, the symbol % used with respect to element content indicates mass %.

C: Greater than 0.35% to 0.60%

C is added for establishing component tensile strength and increasing low ductility/toughness pearlite fraction so as to achieve good fracture-splitability. When added excessively, however, the pearlite fraction becomes too large and yield ratio declines owing to structure coarsening. C content must therefore be in the range of greater than 0.35% to 0.60%. The preferred range is greater than 0.35% to 0.48%.

Si: 0.50 to 2.50%

Si is added for strengthening ferrite by solid solution strengthening, thereby establishing good fracture-splitability by reducing ductility/toughness. When Si is added excessively, however, the ferrite fraction becomes too large, which has the contrary effect of lowering fracture-splitability. Si content must therefore be in the range of 0.50 to 2.50%. The preferred range is 0.60 to 1.50%.

Mn: 0.20 to 2.00%

Mn is added for strengthening ferrite by solid solution strengthening, thereby establishing good fracture-splitability by reducing ductility/toughness. When added excessively, however, pearlite lamellar spacing is reduced, which degrades fracture-splitability by increasing pearlite ductility/toughness and also heavily degrades fracture-splitability by promoting bainite formation. Mn content must therefore be in the range of 0.20 to 2.00%. The preferred range is 0.30 to 1.00%.

P: 0.010 to 0.150%

P is added for realizing good fracture-splitability by reducing ferrite and pearlite ductility/toughness. However, excessive addition degrades hot-ductility, which makes cracks and defects more likely to occur during hot-working. P content must therefore be in the range of 0.010 to 0.150%. The preferred range is 0.030 to 0.070%.

S: 0.040 to 0.150%

S combines with Mn to form MnS (MnS inclusions) and works to improve machinability in proportion to the amount added. It is therefor actively added to produce a machinability improving effect in place of that of Pb. Moreover, in the case where, as discussed later, small amounts of Zr and Ca are added and Al content is restricted, S helps to achieve abundant, fine dispersion of small-aspect-ratio MnS inclusions in the steel, thereby improving fracture-splitability by establishing crack propagation paths during fracture-splitting. But excessive S addition lowers hot-ductility, which makes cracks and defects more likely to occur during hot-working. S content must therefore be in the range of 0.040 to 0.150%. The preferred range is 0.060 to 0.120%.

V: 0.10 to 0.50%

V is added because, during cooling after hot-forging, it forms primarily carbides and carbonitrides that strengthen ferrite by precipitation hardening, thereby reducing ductility/toughness to establish good fracture-splitability and also enhance yield ratio. But the effect of V saturates when it is added excessively. V content must therefore be in the range of 0.10 to 0.50%. The preferred range is 0.20 to 0.35%.

Zr: 0.0005 to 0.0050%, Ca: 0.0005 to 0.0050%, and Al: less than 0.01%

Simultaneous control of the amounts of added Zr, Ca and Al enables abundant, fine dispersion of small-aspect-ratio MnS inclusions in the steel. The resulting MnS inclusions act as crack propagation paths during fracture-splitting, thereby improving fracture-splitability. The cracks that propagate via the finely dispersed MnS inclusions have a beneficial effect on fracture-splitability because they grow linearly with little branching or bending, thereby minimizing deformation during fracture-splitting. On the other hand, when the amount of coarse MnS inclusions is great, separation occurs and cracks form parallel to the direction of MnS inclusion elongation. Fracture-splitability therefore declines owing to increased deformation during fracture-splitting. Moreover, abundant, fine dispersion of small-aspect-ratio MnS inclusions in the steel enables improvement of machinability without impairing mechanical properties such as fatigue properties even when S content is increased. Simultaneous control of the amounts of added Zr, Ca and Al therefore has a critical effect on improvement of both fracture-splitability and machinability.

Zr is a deoxidizer that forms Zr oxides. Zr oxides increase the number of MnS inclusion crystallization and precipitation sites and thus work to establish uniform, fine dispersion of the MnS inclusions. Moreover, Zr dissolves into the MnS inclusions to form complex sulfides and lower the deformability thereof, thereby inhibiting drawing of the MnS inclusions during rolling and hot-forging. Zr is therefore highly effective for improving fine dispersion and anisotropy of MnS inclusions. But excessive Zr addition causes formation of large amounts of hard ZrS, ZrN and other non-oxide inclusions and clusters thereof. As this has the contrary effect of degrading machinability, fatigue properties and other mechanical properties, Zr content must be in the range of 0.0005 to 0.0050%. The preferred range is 0.0005 to 0.0030%, more preferred range is 0.0010 to 0.00300, and most preferred range is 0.0015 to 0.0025%.

Ca is a deoxidizer. It forms soft oxides that improve machinability and also dissolves into MnS inclusions to form complex sulfides and lower the deformability thereof, thereby inhibiting drawing of the MnS inclusions during rolling and hot-forging. Moreover, Ca added in a small amount results in Ca oxides being incorporated within and in combination with the Zr oxides to maximize the effect of the Zr oxides as crystallization and precipitation nuclei. Therefore, Ca added in a specified amount together with Zr effectively improves MnS inclusion anisotropy. But excessive Ca addition causes formation of large amounts of hard CaO. As this has the contrary effect of degrading machinability, Ca content must be in the range of 0.0005 to 0.0050%. The preferred range is 0.0005 to 0.0030%, more preferred range is 0.0007 to 0.0025%, and most preferred range is 0.0010 to 0.0020%.

Al is a strong deoxidizer that forms $Al_2O_3$. When Al is added to a steel containing Zr and Ca, preferential formation of $Al_2O_3$ impairs formation of the Zr and Ca oxides that help to uniformly and finely disperse MnS inclusions. This leads to formation of a large amount of coarse MnS inclusions that impair fracture-splitability, fatigue properties and other mechanical properties. Al content must therefore be reduced to the utmost possible. In addition, $Al_2O_3$ is hard and may accelerate tool wear by causing tool damage during cutting. For this reason, too, Al content must be limited as far as possible. Specifically, it needs to be restricted to less than 0.010%. The preferred range of Al content is less than 0.007% and the more preferred range is 0.004% or less. The lower limit of Al content analysis is 0.001%.

It follows from the foregoing that if the component content range for any of Zr, Ca and Al is not met, abundant, fine dispersion of small-aspect-ratio MnS inclusions in the steel cannot be achieved, making improvement of fracture-splitability and machinability impossible.

N: 0.0020 to 0.0200%

N is added because, during cooling after hot-forging, it forms primarily V carbides and V carbonitrides that act as ferrite transformation nuclei, thereby promoting ferrite transformation and inhibiting formation of bainite, which heavily impairs fracture-splitability. However, excessive addition degrades hot-ductility, which makes cracks and defects more likely to occur during hot-working. N content must therefore be in the range of 0.0020 to 0.0200%. The preferred range is 0.0040 to 0.0100%.

In the present invention, one or more of Cr: 0.05 to 0.25%, Nb: 0.005 to 0.050% and Ti: 0.005 to 0.050% are added as required in the case where it is desired to establish still better fracture-splitability by further strengthening ferrite to reduce ductility/toughness.

Cr: 0.05 to 0.25%

Cr, like Mn, works to strengthen ferrite by solid solution strengthening, thereby lowering ductility/toughness to establish good fracture-splitability. Cr is required to be present at a content of 0.05% or greater to obtain this effect. But when excessive Cr is added, pearlite lamellar spacing is reduced, which degrades fracture-splitability by increasing pearlite ductility/toughness and also heavily degrades fracture-splitability by promoting bainite formation. Cr content must therefore be 0.25% or less. The preferred range is 0.05 to 0.10%.

Nb: 0.005 to 0.050%

Nb is added because, during cooling after hot-forging, it forms primarily carbides and carbonitrides that strengthen ferrite by precipitation hardening, thereby reducing ductility/toughness to establish good fracture-splitability. But the effect of Nb saturates when it is added excessively. Nb content must therefore be in the range of 0.005 to 0.050%. The preferred range is 0.010 to 0.030%.

Ti: 0.005 to 0.050%

Ti is added because, during cooling after hot-forging, it forms primarily carbides and carbonitrides that strengthen ferrite by precipitation hardening, thereby reducing ductility/toughness to establish good fracture-splitability. But the effect of Ti saturates when it is added excessively. Moreover, excessive addition may have the contrary effect of degrading machinability. Ti content must therefore be in the range of 0.005 to 0.050%. The preferred range is 0.010 to 0.030%.

Mg: 0.0005 to 0.0050%.

Mg is a deoxidizer that forms Mg oxides. Mg oxides act as crystallization and precipitation nuclei of MnS inclusions. Thus, by increasing the number of MnS inclusion crystallization and precipitation sites, they work to establish uniform, fine dispersion of the MnS inclusions. Moreover, Mg dissolves into the MnS inclusions to form complex sulfides and lower the deformability thereof, thereby inhibiting drawing of the MnS inclusions during rolling and hot-forging. Mg is therefore effective for improving fine dispersion and anisotropy of MnS inclusions. But excessive Mg addition causes formation of many large inclusions and clusters thereof. As this has the contrary effect of degrading fatigue properties and other mechanical properties, Mg content must be in the range of 0.0005 to 0.0050%. The preferred range is 0.0010 to 0.0030%.

In the present invention, components other than the foregoing, such as Te, Zn, Sn and the like, may be added in amounts that do not impair the effect of the invention.

An explanation will be made as to why the invention specifies the number of MnS inclusions of 1 μm or greater width present at ¼ diameter of the hot-rolled steel to be 10% or less (including 0%) of the total number of MnS inclusions thereat and the average aspect ratio of the MnS inclusions to be 10 or less.

The morphology of the MnS inclusions affects the fracture-splitability and machinability of the steel. Observations of MnS are shown in FIG. 1. In the comparative example shown FIG. 1(a), numerous MnS inclusions measuring 1 μm or greater in width are present and many have an aspect ratio greater than 10. To the contrary, in the invention example shown in FIG. 1(b), the MnS inclusions are fine, with very few having a width of 1 μm or greater, and those of small aspect ratio are overwhelmingly numerous. Abundant, fine dispersion of small-aspect-ratio MnS in the steel enables the MnS inclusions to act as crack propagation paths during fracture-splitting, thereby improving fracture-splitability. The cracks that propagate via such small MnS inclusions of less than 1 μm width have a beneficial effect on fracture-splitability because they grow linearly with little branching or bending, thereby minimizing deformation during fracture-splitting. On the other hand, when the amount of MnS inclusions of an aspect ratio exceeding 10 is great or the amount of coarse MnS inclusions of 1 μm or greater width is great, separation occurs and cracks form parallel to the direction of MnS inclusion elongation. Fracture-splitability therefore declines owing to increased deformation during fracture-splitting. Moreover, abundant, fine dispersion of small-aspect-ratio MnS inclusions in the steel enables improvement of machinability without impairing mechanical properties such as fatigue properties even when S content is increased. But when the amount of MnS inclusions of an aspect ratio exceeding 10 is great or the amount of coarse MnS inclusions of 1 μm or greater width is great, fatigue properties and other mechanical properties are impaired. Therefore, at the region midway between the center and surface of the hot-rolled bar, the number of MnS inclusions of 1 μm or greater width must be controlled to 10% or less of the total number of MnS inclusions and the average aspect ratio of the MnS inclusions must be controlled to 10 or less. The preferred ranges are 5% or less and 8 or less, respectively. The more preferred range of the average aspect ratio of the MnS inclusions is 4.5 or less. It is worth noting that the MnS inclusion present in the hot-rolled steel do not grow during heating prior to hot-forging.

An explanation will be made as to why the invention specifies that bainite fraction accounts for 3% or less (including 0%) of the steel structure and that the remaining structure is ferrite/pearlite.

After being hot-forged at an ordinary temperature and then air-cooled, a component made of the invention steel fundamentally has a ferrite/pearlite structure. Since a ferrite/pearlite structure whose chemical composition is controlled to within the range of the present invention can be made low in ductility/toughness, it is excellent in fracture-splitability. However, depending on the post-hot-forging cooling conditions and the like, the steel may experience emergence of bainite. As this causes substantial structure refinement, ductility/toughness becomes high and fracture-splitability is heavily degraded as a result. Since a structure low in bainite is therefore preferable, the cooling conditions and the like following hot-forging must be optimized to inhibit bainite formation, namely, to keep the bainite area fraction to 3% or less (including 0%). When the bainite fraction is 3% or less, it exhibits almost no adverse effect. By "ferrite" as termed here is meant a structure that, when mirror-polished and revealed by nital etching, is observed under a light microscope at 100 to 1,000 magnifications to have a relatively clear white boundary with adjacent structures and substantially no internal iron carbide. By "pearlite" is meant a structure that appears black or grey under a light microscope and exhibits lamellar structure when observed with an electron microscope at 1,000 to 20,000 magnifications. By "bainite" is meant a structure other than the aforesaid structures that usually looks white under light microscope observation and is present as irregularly shaped grains with a small amount of precipitated iron carbide.

Insofar as the bainite fraction of the hot-forged component made of the invention steel has a bainite fraction of less than 3%, the cooling after hot-forging need not be air-cooling but can of course be forced cooling such as ram air cooling or the like.

Cu, Ni and Mo, when present in small quantities, have no particular effect on the properties of the invention microalloyed steel. However, all of these elements tend to promote bainite formation at some level of addition. For preventing bainite occurrence, the content of these elements as unavoidable impurities is preferably controlled to 0.15% for each of Cu and Ni and 0.01% for Mo. When too much O is present in the steel, it combines with Si, Al and Zr to form hard oxides, which degrade machinability when present in large quantities, and fine dispersion of Zr oxides becomes impossible. O content is therefore preferably controlled to 0.02% or less.

EXAMPLES

The present invention is explained further with reference to examples below.

Converter-produced steels of the compositions shown in Table 1 were continuously cast, subjected to dispersion treatment by soaking as required, and bloom-rolled into a 162 mm square rolled workpieces. Each workpiece was hot-rolled into a 45 mm diameter steel bar shape. The underlining with respect to comparative steels in Table 1 indicates that the value is outside the invention range.

Next, in order to examine the dispersed state of MnS inclusions in the hot-rolled steels, a test piece for structure observation was cut from the region midway between the center and surface of each hot-rolled bar. A cross-section parallel to the rolling direction was selected as the surface of observation so that the state of MnS inclusion drawing could be determined. The surface of observation was mirror-polished, whereafter the MnS inclusions were extracted with an image processor. The rolling direction length, radial direction thickness and aspect ratio (rolling direction length/radial direction thickness) of the individual extracted MnS inclusions were converted to digital data. Measurement was conducted with respect to fifty 500× fields each having an area of 9,000 µm$^2$. The acquired data was used to calculate the average aspect ratio and the percentage of the total number of MnS inclusions accounted for by MnS inclusions of 1 µm or greater width.

A text piece equivalent to a forged conrod was then fabricated by forging in order to examine fracture-splitability, structure and mechanical properties. Specifically, a 45 mm diameter bar workpiece was heated to 1,150 to 1,280° C., forged perpendicularly to the bar longitudinal direction to a thickness of 20 mm, and cooled to room temperature either spontaneously in air or by ram air cooling in a ram cooling unit. Product No. 5 (see Table 2) was ram air cooled and Product No. 24 was forced ram air cooled. From each cooled product was prepared a JIS No. 4 tensile test piece, a test piece for machinability evaluation, and a test piece for fracture-splitability evaluation having a shape corresponding to the big end of a conrod. The test piece for fracture-splitability evaluation was an 18 mm-thick 80 mm×80 mm plate formed at the center with a 50 mm diameter hole. At two 180 degree opposed locations on the inner surface of the 50 mm hole, 45-degree V notches of 1 mm depth and tip radius of curvature of 0.5 mm were machined to extend in the direction perpendicular to the longitudinal direction of the bar workpiece before forging.

The testing apparatus for evaluating fracture-splitability consisted of a split die and a drop impact tester. The split die had the shape of a cylinder formed on a rectangular steel member and split in two along its center line. One of the halves was stationary and the other movable along a rail. A wedge hole was machined in the mating faces of the two

TABLE 1

| Steel. | C | Si | Mn | P | S | V | Cr | Ti | Nb | Al | Zr | Ca | Mg | N | O | Pb | Remark |
|---|---|---|---|---|---|---|---|---|---|---|---|---|---|---|---|---|---|
| A | 0.43 | 1.10 | 0.85 | 0.050 | 0.090 | 0.25 | 0.10 | — | — | — | 0.0020 | 0.0010 | — | 0.0103 | 0.0015 | — | FUIn- |
| B | 0.40 | 0.70 | 0.80 | 0.050 | 0.090 | 0.25 | 0.10 | — | — | — | 0.0020 | 0.0013 | — | 0.0100 | 0.0024 | — | vention |
| C | 0.43 | 0.92 | 0.79 | 0.049 | 0.091 | 0.30 | — | — | — | 0.001 | 0.0022 | 0.0009 | — | 0.0049 | 0.0015 | — | |
| D | 0.40 | 0.70 | 0.52 | 0.052 | 0.091 | 0.29 | 0.05 | — | — | — | 0.0021 | 0.0010 | — | 0.0101 | 0.0026 | — | |
| E | 0.36 | 0.55 | 0.45 | 0.065 | 0.081 | 0.50 | — | — | — | 0.001 | 0.0011 | 0.0015 | — | 0.0020 | 0.0020 | — | |
| F | 0.60 | 2.50 | 0.20 | 0.010 | 0.150 | 0.10 | 0.05 | — | — | 0.006 | 0.0025 | 0.0008 | — | 0.0200 | 0.0025 | — | |
| G | 0.36 | 0.50 | 2.00 | 0.045 | 0.095 | 0.30 | — | — | — | 0.010 | 0.0050 | 0.0005 | 0.0010 | 0.0120 | 0.0004 | — | |
| H | 0.50 | 1.30 | 0.40 | 0.025 | 0.112 | 0.35 | — | — | — | 0.001 | 0.0005 | 0.0050 | — | 0.0125 | 0.0020 | — | |
| I | 0.45 | 0.61 | 0.35 | 0.099 | 0.088 | 0.38 | 0.25 | 0.005 | — | 0.007 | 0.0023 | 0.0018 | — | 0.0091 | 0.0025 | — | |
| J | 0.39 | 0.98 | 1.15 | 0.055 | 0.063 | 0.20 | 0.12 | — | 0.020 | 0.004 | 0.0018 | 0.0011 | — | 0.0069 | 0.0013 | — | |
| K | 0.36 | 0.70 | 1.00 | 0.050 | 0.090 | 0.30 | 0.10 | 0.015 | — | 0.001 | 0.0020 | 0.0010 | — | 0.0145 | 0.0021 | — | |
| L | 0.36 | 0.70 | 0.80 | 0.150 | 0.040 | 0.25 | 0.10 | 0.019 | 0.005 | — | 0.0020 | 0.0010 | — | 0.0044 | 0.0035 | — | |
| M | 0.42 | 0.79 | 0.78 | 0.045 | 0.065 | 0.19 | — | 0.008 | 0.005 | 0.003 | 0.0015 | 0.0012 | — | 0.0139 | 0.0022 | — | |
| N | 0.42 | 1.05 | 0.84 | 0.051 | 0.093 | 0.25 | 0.10 | — | — | — | = | 0.0010 | — | 0.0105 | 0.0015 | — | Compar- |
| O | 0.43 | 1.01 | 0.83 | 0.050 | 0.092 | 0.25 | 0.09 | — | — | 0.014 | 0.0020 | 0.0010 | — | 0.0101 | 0.0015 | — | ative |
| P | 0.42 | 1.01 | 0.84 | 0.049 | 0.090 | 0.25 | 0.10 | — | — | 0.001 | 0.0020 | = | — | 0.0103 | 0.0015 | — | |
| Q | 0.43 | 1.04 | 0.86 | 0.049 | 0.091 | 0.25 | 0.10 | — | — | 0.003 | 0.0095 | 0.0008 | — | 0.0087 | 0.0009 | — | |
| R | 0.43 | 1.10 | 0.85 | 0.006 | 0.091 | 0.25 | 0.10 | — | — | 0.002 | 0.0015 | 0.0011 | — | 0.0077 | 0.0025 | — | |
| S | 0.41 | 1.15 | 0.80 | 0.052 | 0.036 | 0.25 | 0.08 | — | — | 0.007 | 0.0022 | 0.0013 | — | 0.0081 | 0.0022 | — | |
| T | 0.28 | 1.21 | 0.94 | 0.050 | 0.090 | 0.33 | 0.11 | — | — | 0.008 | 0.0012 | 0.0009 | — | 0.0066 | 0.0019 | — | |
| U | 0.43 | 1.10 | 0.85 | 0.050 | 0.090 | 0.05 | 0.10 | — | — | — | 0.0026 | 0.0016 | — | 0.0096 | 0.0018 | — | |
| V | 0.41 | 0.89 | 0.83 | 0.049 | 0.089 | 0.25 | 0.32 | — | — | 0.005 | 0.0009 | 0.0014 | — | 0.0110 | 0.0009 | — | |
| W | 0.42 | 1.05 | 0.86 | 0.052 | 0.031 | 0.25 | 0.09 | — | — | 0.025 | = | = | — | 0.0099 | 0.0013 | 0.045 | |

A dash (—) indicates that the content of the element is on the level of an unavoidable impurity.
Underlining indicates that the value is outside the invention range hemicylinders. In the fracture-split test, the test piece was clamped in the split die, a wedge was inserted, and the assembly was placed on the drop impact tester. The falling weight, which weighed 200 kg, was arranged to drop along a guide. When dropped, the falling weight drove the wedge inward to fracture-split the test piece in two by tensile fracture. Disengagement of the test piece during splitting was prevented by clamping the periphery of the split die to force it against the test piece.

In these examples, fracture-splitting was conducted by dropping the weight from a height of 100 mm. The halves of fracture-split test piece were then bolted together and the changes of the inner diameter in the fracture-splitting direction and the direction perpendicular thereto were measured.

A cross-section 5 mm apart from the fraction-split surface was etched with nital and the steel structure was observed. The observation was done at 200 magnifications with a light microscope. White irregularly shaped grains with a small amount of precipitated iron carbide were counted as bainite and the area fraction thereof was calculated.

Machinability was evaluated based on drill life property. Specifically, the cumulative hole depth was measured up to drill breakage at different drill periphery speeds. In addition, the maximum peripheral speed VL1000 (m/min) enabling cutting up to a cumulative hole depth of 1000 mm was used as an evaluation index of machinability.

The specific evaluation conditions are shown in Table 3.

The aforesaid property evaluation results are shown in Table 2. Regarding yield ratio, a test piece whose yield ratio was less than 0.75 was assessed as failing to achieve the desired value. Regarding fracture-splitability, a test piece whose deformation exceeded 100 μm was assessed as failing to achieve the desired value; Regarding machinability, a test piece whose VL1000 was less than 40 m/min was assessed as failing to achieve the desired value on the grounds that its machinability was markedly lower than that of Product No. 22 (Steel No. 22), which was a Pb-containing steel.

The results of the evaluations are shown in Table 2. "MnS" appearing in the "MnS width" and "MnS average aspect ratio" columns of Table 2 is an abbreviation for "MnS inclusions" used for convenience in the table. All of Products No. 1 to 13, which are invention examples, achieved the desired values and can be seen to be excellent in fracture-splitability and machinability. In contrast, Products No. 14 to 17 were poor in fracture-splitability because they had Zr, Al, Ca and S contents outside the invention ranges, so that they could not achieve fine dispersion of MnS inclusions and all of their MnS inclusion average aspect ratios failed to satisfy the invention requirement. Since No. 14 did not contain added Zr and No. 15 contained much added Al, fine Zr oxides were not formed and many coarse MnS inclusions of 1 μm or greater width were formed, so that fracture-splitability was poor. Products No. 16 and 17 sustained formation of much $Al_2O_3$, ZrN and other hard inclusions that promoted tool wear. They were therefore poor in machinability. Product No. 18 did not achieve the desired fracture-splitability because it had a P content outside the invention range. Product No. 19 did not achieve the desired fracture-splitability or the desired machinability because it had an S content outside the invention range and was therefore deficient in fine MnS inclusions. Product No. 20 did not achieve the desired fracture-splitability because it was high in ductility/toughness owing to a C content outside the invention range. Product No. 21 did not achieve the desired yield ratio or the desired fracture-splitability because it was deficient in precipitation hardening by V carbonitrides owing to a V content outside the invention range. Product No. 22 did not achieve the desired fracture-splitability because it incurred emergence of bainite owing to a Cr content outside the invention range. Product No. 23 was excellent in machinability owing to inclusion of added Pb but failed to achieve the desired fracture-splitability owing to S, Zr, Al and Ca contents outside the invention ranges. Product No. 24 had a composition within the range of the invention but did not achieve the desired fracture-splitability because its bainite fraction exceeded 3% as a result of the cooling rate being accelerated by forced ram air cooling.

TABLE 2

| Product No. | Steel No. | MnS width ≥1 μm inclusion ratio (%) | MnS average aspect ratio | Post-forge cooling | Bainite fraction (%) | Yield strength (MPa) | Tensile strength (MPa) | Yield ratio | Deformation (μm) | VL1000 m/min. | Remarks |
|---|---|---|---|---|---|---|---|---|---|---|---|
| 1 | A | 2.5 | 3.8 | Air | 0 | 854 | 1095 | 0.78 | 61 | 51 | Invention |
| 2 | B | 1.6 | 4.3 | Air | 0 | 783 | 991 | 0.79 | 78 | 48 | |
| 3 | C | 2.1 | 4.2 | Air | 0 | 835 | 1085 | 0.77 | 60 | 55 | |
| 4 | D | 2.2 | 4.2 | Air | 0 | 755 | 956 | 0.79 | 85 | 49 | |
| 5 | E | 8.2 | 4.0 | Ram air | 2 | 833 | 1041 | 0.80 | 67 | 47 | |
| 6 | F | 2.9 | 5.8 | Air | 0 | 911 | 1199 | 0.76 | 43 | 45 | |
| 7 | G | 3.0 | 8.5 | Air | 0 | 957 | 1182 | 0.81 | 46 | 45 | |
| 8 | H | 4.9 | 4.1 | Air | 0 | 891 | 1173 | 0.76 | 44 | 54 | |
| 9 | I | 3.3 | 7.2 | Air | 0 | 812 | 1055 | 0.77 | 56 | 46 | |
| 10 | J | 1.0 | 4.4 | Air | 0 | 837 | 1060 | 0.79 | 67 | 53 | |
| 11 | K | 2.2 | 3.9 | Air | 0 | 856 | 1031 | 0.83 | 70 | 45 | |
| 12 | L | 1.1 | 4.0 | Air | 0 | 786 | 947 | 0.83 | 57 | 44 | |
| 13 | M | 2.8 | 4.5 | Air | 0 | 794 | 998 | 0.80 | 66 | 47 | |
| 14 | N | <u>12.3</u> | <u>13.9</u> | Air | 0 | 835 | 1071 | 0.78 | <u>166</u> | 43 | Comparative |
| 15 | O | <u>15.0</u> | <u>15.5</u> | Air | 0 | 826 | 1073 | 0.77 | <u>160</u> | <u>28</u> | |
| 16 | P | 7.1 | <u>11.4</u> | Air | 0 | 832 | 1067 | 0.78 | <u>146</u> | 45 | |
| 17 | Q | 4.4 | <u>12.2</u> | Air | 0 | 837 | 1087 | 0.77 | <u>149</u> | <u>24</u> | |
| 18 | R | 3.1 | 4.9 | Air | 0 | 843 | 1095 | 0.77 | <u>190</u> | 51 | |
| 19 | S | 1.0 | 3.0 | Air | 0 | 843 | 1067 | 0.79 | <u>164</u> | <u>21</u> | |
| 20 | T | 2.5 | 4.1 | Air | 0 | 869 | 1035 | 0.84 | <u>192</u> | 50 | |
| 21 | U | 2.8 | 4.3 | Air | 0 | 656 | 937 | <u>0.70</u> | <u>206</u> | 51 | |
| 22 | V | 2.1 | 4.2 | Air | <u>9</u> | 819 | 1063 | 0.77 | <u>228</u> | 47 | |
| 23 | W | <u>10.5</u> | <u>13.0</u> | Air | 0 | 841 | 1078 | 0.78 | <u>213</u> | 54 | |
| 24 | A | 2.5 | 3.8 | Ram air | <u>15</u> | 842 | 1108 | 0.76 | <u>278</u> | 41 | |

Underlining of a ≥1 μm MnS inclusion ratio, MnS average aspect ratio or bainite fraction indicates that the value was outside the invention range.
Underlining of a yield ratio, deformation or VL100 indicates that the desired value was not achieved.

TABLE 3

| Cutting conditions | | Drill | | Other | |
|---|---|---|---|---|---|
| Cutting speed | 10-70 m/min | Diameter | 3 mm | Hole depth | 9 mm |
| Feed | 0.25 mm/rev | Tip angle | 118 degrees | Tool life | Until breakage |
| Cutting fluid | Water-soluble cutting oil | Material | High speed steel | | |

INDUSTRIAL APPLICABILITY

The invention hot-forging micro-alloyed steel and hot-rolled steel, which are excellent in fracture-splitability and machinability and usable in the manufacture of steel components separated for use by fracture-splitting, can be applied in the fracture-splitting method. Owing to their excellent machinability, their utilization in the automobile connecting rod manufacturing, for example, enables substantial simplification of the production process; cost reduction and component weight reduction.

What is claimed is:

1. A hot-forging micro-alloyed steel excellent in fracture-splitability and machinability comprising, in mass %, C: from 0.35 to 0.60%, Si: 0.50 to 2.50%, Mn: 0.20 to 2.00%, P: 0.010 to 0.150%, S: 0.040 to 0.150%, V: 0.10 to 0.50%, Zr: 0.0005 to 0.0023%, Ca: 0.0005 to 0.0050% and N: 0.0069 to 0.0200%, Al being limited to less than 0.010%, and a balance substantially of Fe and unavoidable impurities, further including MnS inclusions having an average aspect ratio of 10 or less and wherein greater than 90% of a total number of MnS inclusions present in ¼ diameter of the hot-forging micro-alloyed steel have a width of 1 μm or less.

2. A hot-forging micro-alloyed steel excellent in fracture-splitability and machinability according to claim 1, further comprising, in mass %, one or more of Cr: 0.05 to 0.25%, Nb: 0.005 to 0.050% and Ti: 0.005 to 0.050%.

3. A hot-forging micro-alloyed steel excellent in fracture-splitability and machinability according to claim 1 or 2, further comprising, in mass %, Mg: 0.0005 to 0.0050%.

4. A hot-forged micro-alloyed steel according to claim 1, wherein greater than 97.8% of a total number of MnS inclusions present in ¼ diameter of the hot-forging micro-alloyed steel have a width of 1 μm or less.

5. A hot-forged micro-alloyed steel component excellent in fracture-splitability and machinability having a steel composition set out in claim 1, wherein the steel structure comprises a bainite fraction of 3% or less and a balance of ferrite or pearlite or both.

6. A hot-forged micro-alloyed steel according to claim 1, wherein the steel deformation value is 78 μm to 43 μm.

7. A hot-forged micro-alloyed steel according to claim 1, wherein the steel deformation value is 60 μm to 43 μm.

* * * * *

UNITED STATES PATENT AND TRADEMARK OFFICE
CERTIFICATE OF CORRECTION

PATENT NO.       : 8,715,428 B2
APPLICATION NO.  : 12/450567
DATED            : May 6, 2014
INVENTOR(S)      : Manabu Kubota et al.

It is certified that error appears in the above-identified patent and that said Letters Patent is hereby corrected as shown below:

Title Page: Item 54 and in the Specification: Col. 1, Lines 1-5 in the Title, change "HOT-FORGING MICRO-ALLOYED STEEL AND HOT-ROLLED STEEL EXCELLENT IN FRACTURE-SPLITABILITY AND MACHINABILITY, AND COMPONENT MADE OF HOT-FORGED MICROALLOYED STEEL"

To -- HOT-FORGING MICRO-ALLOYED STEEL AND HOT-ROLLED STEEL EXCELLENT IN FRACTURE-SPLITABILITY AND MACHINABILITY, AND COMPONENT MADE OF HOT-FORGED MICRO-ALLOYED STEEL --.

Signed and Sealed this
Seventh Day of October, 2014

Michelle K. Lee
*Deputy Director of the United States Patent and Trademark Office*